United States Patent
Rofougaran

(10) Patent No.: US 9,378,887 B2
(45) Date of Patent: *Jun. 28, 2016

(54) WIRELESS POWER INTERFACE AND DEVICE

(71) Applicant: BROADCOM CORPORATION, Irvine, CA (US)

(72) Inventor: Ahmadreza (Reza) Rofougaran, Newport Coast, CA (US)

(73) Assignee: BROADCOM CORPORATION, Irvine, CA (US)

( * ) Notice: Subject to any disclaimer, the term of this patent is extended or adjusted under 35 U.S.C. 154(b) by 549 days.

This patent is subject to a terminal disclaimer.

(21) Appl. No.: 13/873,537

(22) Filed: Apr. 30, 2013

(65) Prior Publication Data

US 2013/0241307 A1 Sep. 19, 2013

Related U.S. Application Data

(63) Continuation of application No. 13/544,065, filed on Jul. 9, 2012, now Pat. No. 8,451,123, which is a continuation of application No. 13/181,976, filed on Jul. 13, 2011, now Pat. No. 8,248,244, which is a continuation of application No. 12/839,296, filed on Jul. 19, 2010, now Pat. No. 7,986,240, which is a continuation of application No. 11/494,149, filed on Jul. 26, 2006, now Pat. No. 7,760,093.

(51) Int. Cl.
*G08B 13/14* (2006.01)
*H01F 38/14* (2006.01)
*G06K 7/00* (2006.01)
*G06K 19/07* (2006.01)

(52) U.S. Cl.
CPC .............. *H01F 38/14* (2013.01); *G06K 7/0008* (2013.01); *G06K 19/0701* (2013.01); *G06K 19/0715* (2013.01)

(58) Field of Classification Search
CPC ..... H02J 7/025; H01Q 1/2225; H01Q 1/2216; G06K 19/07773
USPC ........ 340/572.1, 572.6, 10.1, 572.7; 235/385, 235/451
See application file for complete search history.

(56) References Cited

U.S. PATENT DOCUMENTS

| | | | | |
|---|---|---|---|---|
| 6,750,771 B1* | 6/2004 | Brand | ................ | G06K 7/10336 340/572.1 |
| 7,198,193 B2* | 4/2007 | Hassan-Zade | ....... | G06K 7/0008 235/385 |
| 7,515,051 B2* | 4/2009 | Wagner | .............. | G06K 7/10346 340/572.1 |
| 2004/0017197 A1* | 1/2004 | Chen | ........................ | G01V 3/28 324/339 |
| 2006/0238307 A1* | 10/2006 | Bauer | ................... | G06K 7/0008 340/10.1 |
| 2007/0126585 A1* | 6/2007 | Okunev | ................ | G06K 7/0008 340/572.7 |
| 2007/0285253 A1* | 12/2007 | Sharma | ................ | G06K 7/0008 340/572.7 |

* cited by examiner

*Primary Examiner* — Phung Nguyen
(74) *Attorney, Agent, or Firm* — Garlick & Markison; Edward Marshall

(57) ABSTRACT

A wireless power interface includes a plurality of coils and a control module. At least two of the plurality of coils has a different orientation with respect to at least two axes of a multi-dimensional axis system. The control module is configured to enable at least one of the plurality of coils based on electro-magnetic coupling by at least one of the plurality of coils with a coil of a wireless power device.

20 Claims, 6 Drawing Sheets

US 9,378,887 B2

WIRELESS POWER INTERFACE AND DEVICE

CROSS REFERENCE TO RELATED PATENTS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 13/544,065, entitled "WIRELESS POWER INTERFACE AND DEVICE," filed Jul. 9, 2012, now issued as U.S. Pat. No. 8,451,123, on May 28, 2013, which claims priority pursuant to 35 U.S.C. §120, as a continuation, to the following U.S. Utility Patent Application which is hereby incorporated herein by reference in its entirety and made part of the present U.S. Utility Patent Application for all purposes:

2. U.S. Utility application Ser. No. 13/181,976, entitled "WIRELESS POWER INTERFACE AND DEVICE," filed Jul. 13, 2011, now issued as U.S. Pat. No. 8,248,244, on Aug. 21, 2012, which claims priority pursuant to 35 U.S.C. §120, as a continuation, to the following U.S. Utility Patent Application which is hereby incorporated herein by reference in its entirety and made part of the present U.S. Utility Patent Application for all purposes:

3. U.S. Utility application Ser. No. 12/839,296, entitled "RFID INTERFACE AND APPLICATIONS THEREOF," filed Jul. 19, 2010, now issued Jul. 26, 2011, as U.S. Pat. No. 7,986,240, which claims priority pursuant to 35 U.S.C. §120, as a continuation, to the following U.S. Utility Patent Application which is hereby incorporated herein by reference in its entirety and made part of the present U.S. Utility Patent Application for all purposes:

4. U.S. Utility application Ser. No. 11/494,149, entitled "RFID INTERFACE AND APPLICATIONS THEREOF," filed Jul. 26, 2006, now issued Jul. 20, 2010 as U.S. Pat. No. 7,760,093.

TECHNICAL FIELD

The embodiments herein relate generally to communication systems and more particularly to wireless power conveyance.

DESCRIPTION OF RELATED ART

A wireless power system generally includes a reader, also known as an interrogator, and a remote tag, also known as a transponder. Each tag stores identification data for use in identifying a person, article, parcel or other object. Wireless power systems may use active tags that include an internal power source, such as a battery, and/or passive tags that do not contain an internal power source, but generate power from radio frequency (RF) signals received from a reader.

In general, to access the identification data stored on RFID tags, the RFID reader generates a modulated RF interrogation signal designed to evoke a modulated RF response from the tag. The RF response from the tag includes the coded identification data stored on the RFID tag. The RFID reader decodes the coded identification data to identify the person, article, parcel or other object associated with the RFID tag. For passive tags, the RFID reader may also generate an unmodulated, continuous wave (CW) signal from which the passive tag derives its power.

Wireless power systems typically employ either far-field technology, in which the distance between the reader and the tag is great compared to the wavelength of the carrier signal, or near-field technology, in which the operating distance is less than one wavelength of the carrier signal. In far-field applications, the RFID reader generates and transmits an RF signal via an antenna to all tags within range of the antenna. One or more of the tags that receive the RF signal responds to the reader using a backscattering technique in which the tags modulate and reflect the received RF signal. In near-field applications, the RFID reader and tag communicate via mutual inductance between corresponding reader and tag inductors.

In wireless power systems that include passive tags, a passive tag's ability to generate power from a received RF signal and/or a mutual inductance signal (hereinafter collectively referred to as an RFID signal) directly correlates to the power level at which the tag receives the signal. The power level of the RFID signal is maximized when the reader and tag have an ideal orientation. For example, for near-field applications, an ideal orientation occurs when the inductor of the reader is parallel to the inductor of the tag. In many near-field applications, however, the reader is a handheld device that is swiped proximal to the tag. In such instances, the ideal orientation is rarely achieved and, as the orientation approaches perpendicular, less and less energy is transferred from the reader's inductor to the tag's inductor.

Therefore, a need exists for a wireless power interface that provides improved energy transfer between the reader and the tag.

DETAILED DESCRIPTION OF THE DRAWINGS

Figure 1:
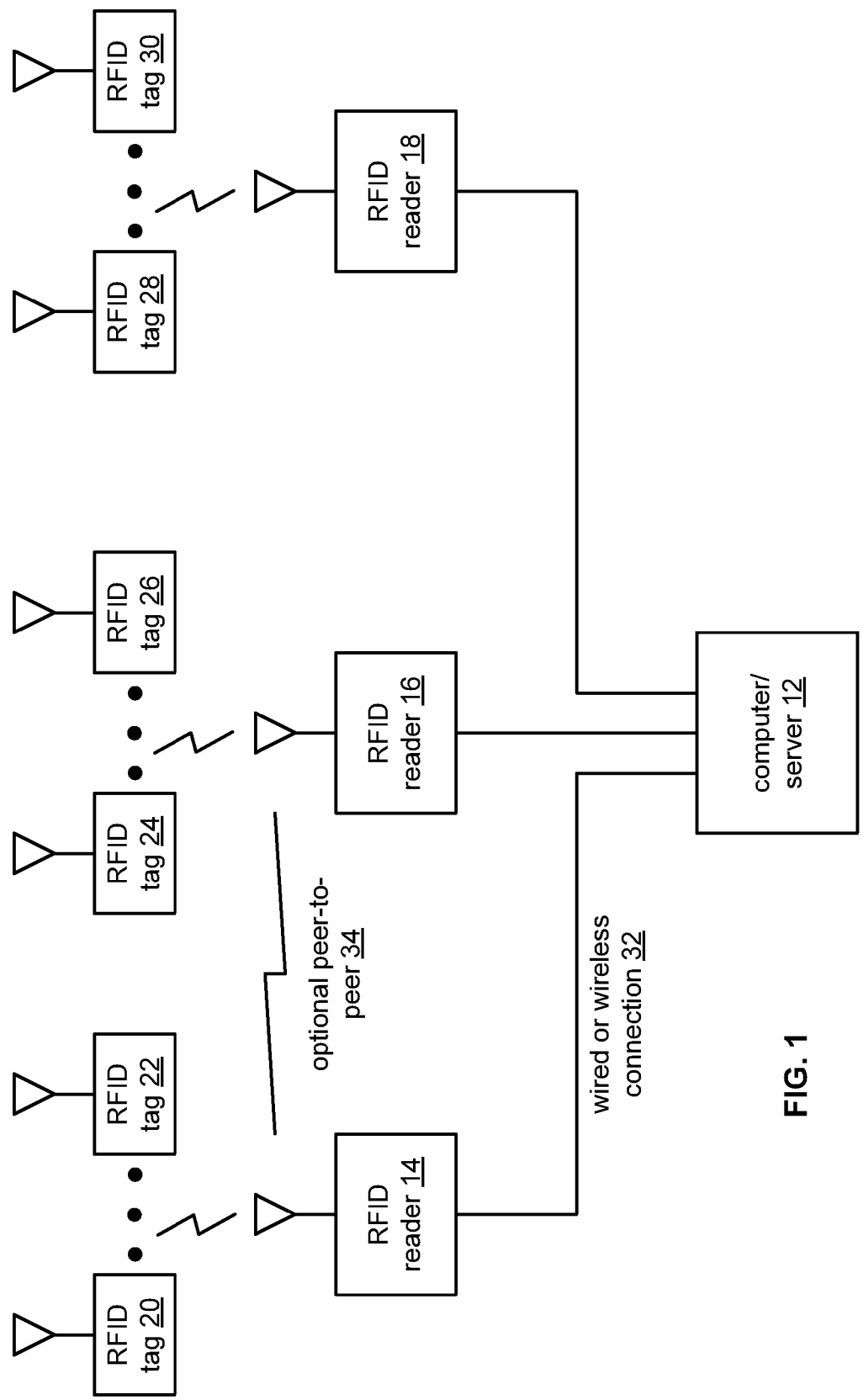
FIG. 1 is a schematic block diagram of an RFID system in accordance with an embodiment of the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera.

Each RFID reader 14-18 wirelessly communicates with one or more RFID tags 20-30 within its coverage area. For example, RFID reader 14 may have RFID tags 20 and 22 within its coverage area, while RFID reader 16 has RFID tags 24 and 26 and RFID reader 18 has RFID tags 28 and 30 within their respective coverage areas. The RF communication scheme between the RFID readers 14-18 and RFID tags 20-30 may be a backscattering technique whereby the RFID readers 14-18 provide energy to the RFID tags via an RFID signal. The RFID tags derive power from the RF signal and respond on the same RF carrier frequency with the requested data.

In this manner, the RFID readers 14-18 collect data as may be requested from the computer/server 12 from each of the RFID tags 20-30 within its coverage area. The collected data is then conveyed to computer/server 12 via the wired or wireless connection 32 and/or via the peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag would store the data in a non-volatile memory.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 to computer/server 12. Communications between RFID reader 16 and computer/server 12 are conveyed through RFID reader 14 and the wired or wireless connection 32, which may be any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 1 may be expanded to include a multitude of RFID readers 14-18 distributed throughout a desired location (for example, a building, office site, et cetera) where the RFID tags may be associated with equipment, inventory, personnel, et cetera. Note that the computer/server 12 may be coupled to another server and/or network connection to provide wide area network coverage.

Figure 2:
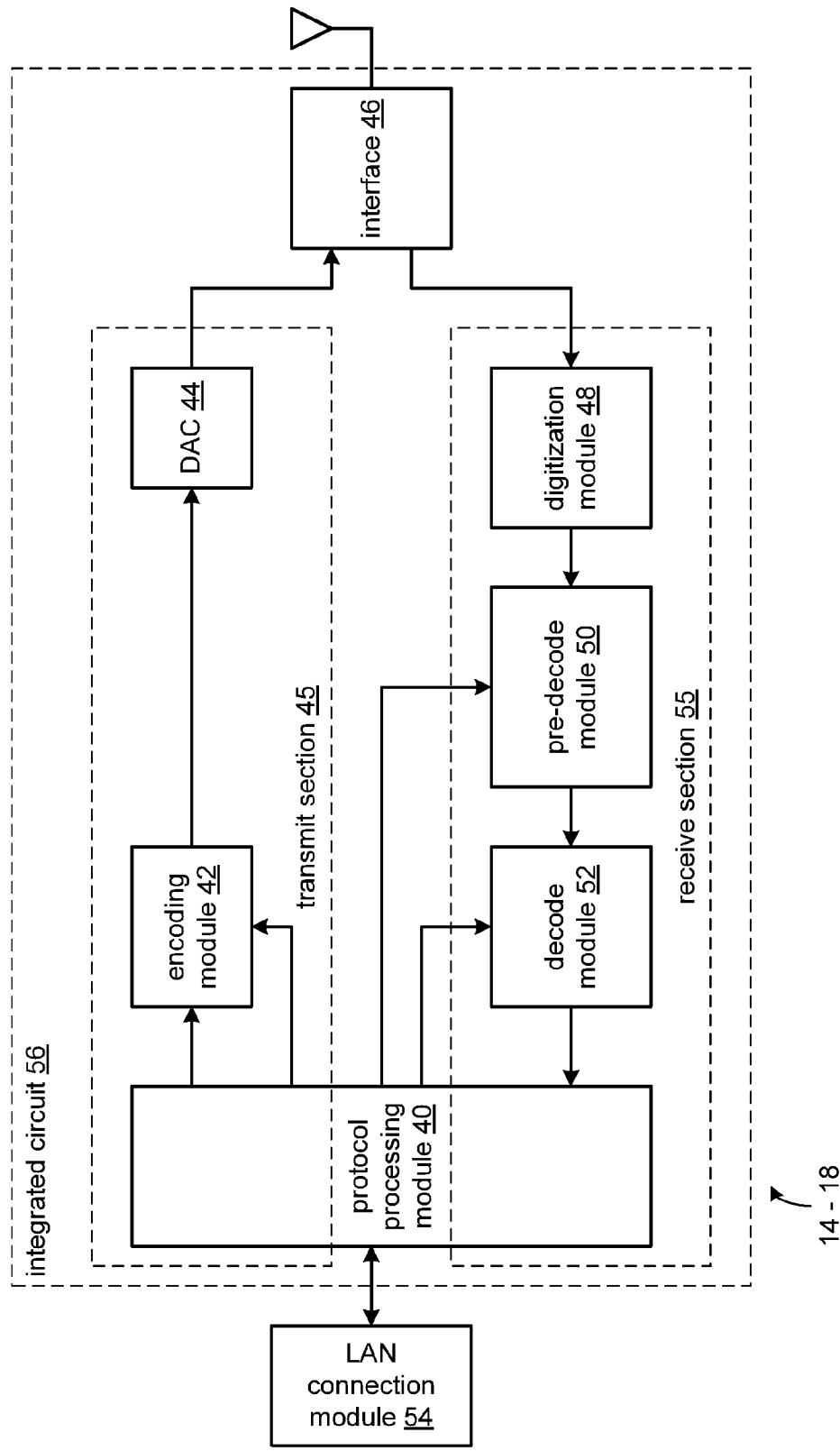
FIG. 2 is a schematic block diagram of an RFID reader in accordance with an embodiment of the present invention.

FIG. 2 is a schematic block diagram of an RFID reader 14-18 that includes an integrated circuit 56 and may further include a local area network (LAN) connection module 54. The integrated circuit 56 includes a transmit section 45, and interface 46, and a receive section 55. The transmit section 45 includes a portion of a protocol processing module 40, an encoding module 42, and a digital-to-analog converter (DAC) 44. The receive section 55 includes a digitization module 48, a pre-decode module 50, a decode module 52, and a portion of the protocol processing module 40. The local area network connection module 54 may include one or more of a wireless network interface (e.g., 802.11n.x, Bluetooth, et cetera) and/ or a wired communication interface (e.g., Ethernet, fire wire, et cetera).

The protocol processing module 40 is operably coupled to prepare data for encoding via the encoding module 42 which may perform a data encoding in accordance with one or more RFID standardized protocols. The encoded data is provided to the digital-to-analog converter 44 which converts the digitally encoded data into an analog signal. The RFID interface includes an RFID front-end, a plurality of coils, and a control module. The RFID front-end modulates the analog signal to produce an RF signal at a particular carrier frequency, which is transmitted to an RFID tag via one or more of the plurality of coils.

The RF front-end includes transmit blocking capabilities such that the energy of the transmit signal does not substantially interfere with the receiving of a backscattered RF signal received from one or more RFID tags via one or more of the plurality of coils. The RF front-end converts the received RF signal into a baseband signal. The digitization module 48, which may be a limiting module or an analog-to-digital converter, converts the received baseband signal into a digital signal. The pre-decode module 50 converts the digital signal into a biphase encoded signal or mixed signal in accordance with the particular RFID protocol being utilized. The biphase encoded or mixed signal is provided to the decoding module 52, which recaptures data therefrom in accordance with the particular encoding scheme of the selected RFID protocol. The protocol processing module 40 provides the recovered data to the server and/or computer via the local area network connection module 54. As one of ordinary skill in the art will appreciate, the RFID protocols (such as EPC class 0, EPC class 1, EPC Class 1 Gen 2, ISO 18000-6, etc.) utilize one or more of line encoding schemes such as Manchester encoding, FM0 encoding, FM1 encoding, four-interval bit cell encoding, etc.

Figure 3:
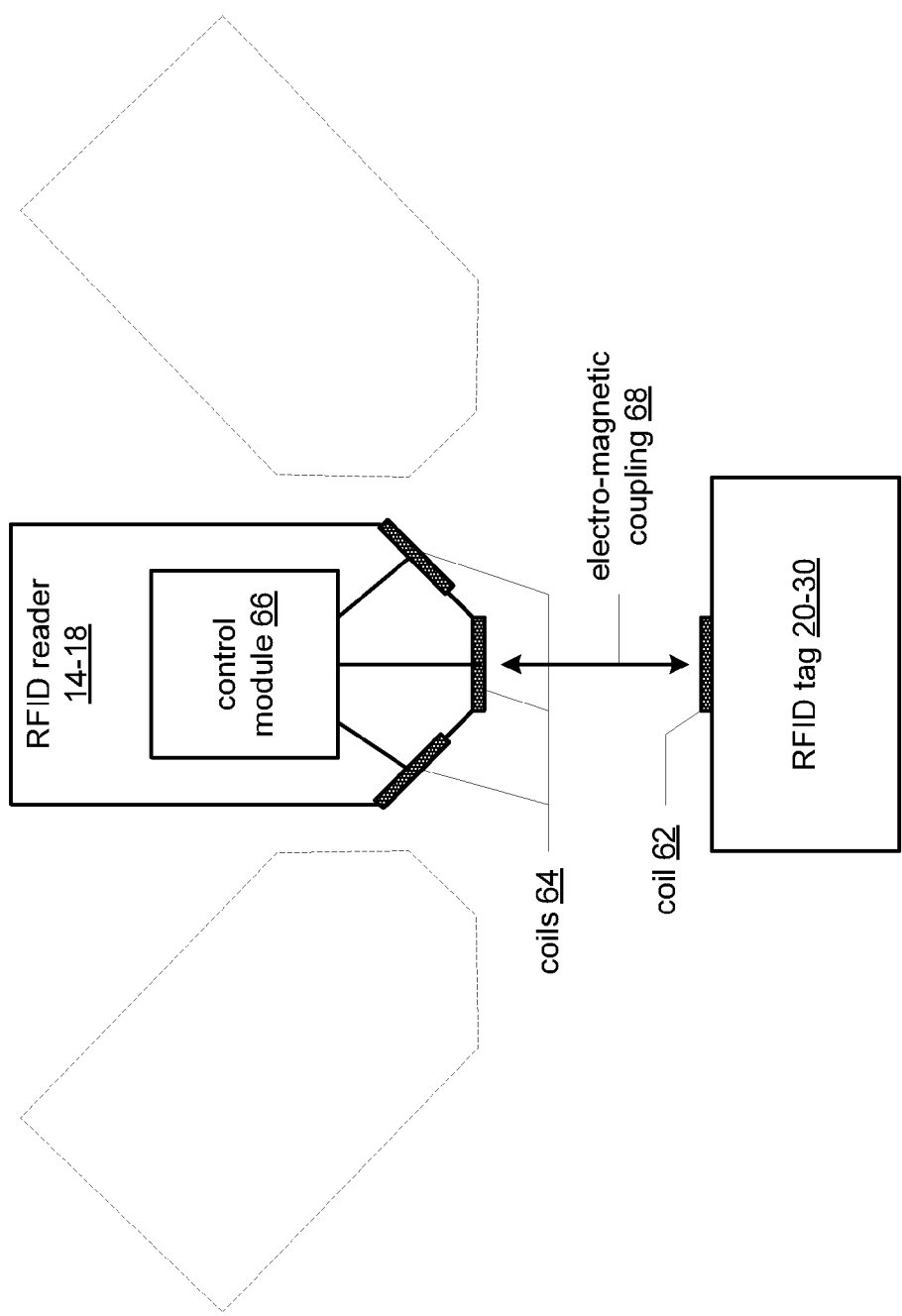
FIG. 3 is a schematic block diagram of an RFID reader and an RFID tag in accordance with an embodiment of the present invention.

FIG. 3 is a schematic block diagram of an RFID reader 14-18 and an RFID tag 20-30. In this illustration, the RFID reader 14-18 includes a control module 66 and a plurality of coils 64 of the interface 46, operable to derive power via an electro-magnetic coupling, and the RFID tag includes a coil 62. Each of the plurality of coils has a different orientation with respect to at least one axis of a multi-dimensional axis system. As shown, one coil has a −45° orientation with respect to an axis perpendicular to the figure, another coil has a 0° orientation with respect to an axis perpendicular to the figure, and a third coil has a +45° orientation with respect to an axis perpendicular to the figure.

As the RFID reader 14-18 is passed over the RFID tag 20-30, the control module 66 enables at least one of the plurality of coils 62 based on electro-magnetic coupling 68 between coil 62 and the least one of the plurality of coils 64. In one embodiment, the control module 66 enables the at least one of the plurality of coils 64 by providing a transmit signal (e.g., the output of the DAC 44) to one of the plurality of coils (e.g., the coil with the −45° orientation). The control module 66 then measures a response from the coil 62 via the enabled coil. Such a response may be a proprietary signal indicating the receipt of the transmit signal and/or the power level of the received transmit signal. In another embodiment, the response may be a backscatter signal in accordance with one or more RFID standards.

The control module 66 then compares the response with a response threshold. Such a comparison may include determining that a response was received within a given time frame. If a response is not received within the given time frame, it is deemed to have compared unfavorably with the response threshold. If a response is received within the given time frame, its power level and/or error rate is compared to a corresponding power level and/or error rate threshold.

If the response compares favorably with the response threshold, the control module 66 utilizes the coil for RFID communications between the RFID tag 20-30 and the RFID reader 14-18. If, however, the response compares unfavorably with the response threshold, the control module 66 then determines whether each of the plurality of coils 66 has been tested. If all of the coils have been tested and none have compared favorably to the response threshold, then the control module 66 generates an error message or some other indication that an electro-magnetic coupling between the RFID reader 14-18 and the RFID tag 20-30 was not established.

When each of the plurality of coils has not been tested, the control module 66 repeats the preceding steps for another one of the plurality of coils 66 (e.g., the coil with the −45° orientation). In this manner, the RFID reader 14-18 does not have to be perpendicular to the RFID tag 20-30 to get an acceptable level of electro-magnetic coupling 68. As shown, the RFID reader 14-18 may be at a +/−45° angle and still achieve an acceptable level of electro-magnetic coupling 68. In this example, with three coils associated with the RFID reader 14-18, the RFID reader 14-18 may be at a severe angle with respect to the RFID tag 20-30 and still achieve an acceptable level of electro-magnetic coupling 68. As one of ordinary skill in the art will appreciate, the RFID 14-18 may include more than three coils and have coils with different axial orientations.

In another embodiment, the control module 66 enables the at least one of the plurality of coils 66 by providing a transmit signal to a first set of the plurality of coils. In this embodiment, the coils of the first set are positioned such that the magnetic fields created by the coil of the first set have minimal interference with each other. The control module 66 then measures a response from the coil 62 via the first set of the plurality of coils. The control module 66 then compares the response with a response threshold as previously described.

If the response compares favorably with the response threshold, the control module 66 utilizes the first set of the plurality of coils for the RFID communications between the RFID tag and the RFID reader. If, however, the response compares unfavorably with the response threshold, the control module 66 repeats the preceding steps for a second set of the plurality of coils, where the magnetic fields created by the coil of the first set have minimal interference with each other. Note that for a near field RFID communication, the control module enables the at least one of the plurality of coils as a winding of a transformer, where the coil 62 of the RFID tag is the other winding of the transformer. Further note that for a far field RFID communication, the control module enables the at least one of the plurality of coils as an antenna to a transmit circuit (e.g., transmit section 45) and a receive circuit (e.g., receive section 55).

Figure 4:
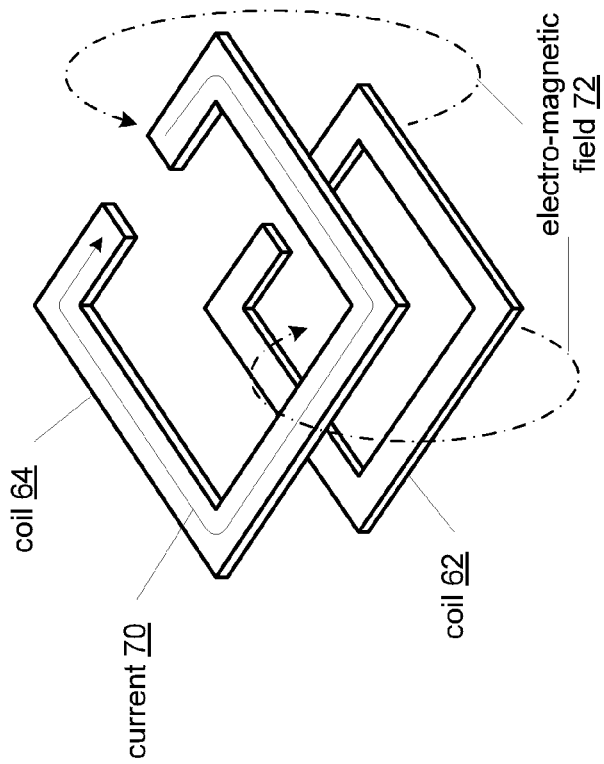
FIG. 4 is a diagram of an RFID reader coil and an RFID tag coil in accordance with an embodiment of the present invention.

FIG. 4 is a diagram of an RFID reader coil 64 and an RFID tag coil 62. The RFID tag coil 62 includes at least one planer winding of a first geometry (e.g., a square, rectangle, oval, circle, hexagon, octagon, and/or any combination thereof) and of a first size. Note that the size of the coil 62 will depend on the frequency of operation, a desired power level, IC fabrication process, printed circuit board (PCB) fabrication process, and/or desired inductance. The RFID reader coil 64, and the other coils of the interface 46, includes at least one planer winding of the first geometry and of a second size. Note that the RFID reader coil 64 will typically be larger than the RFID tag coil 62.

In this example, the RFID reader coil 64 is shown as a single winding for ease of illustration but could include one or more windings on one or more surfaces of the supporting substrate (e.g., IC or PCB). The RFID coil 64 is also shown to be conducting current 70 and thus producing an electro-magnetic field 72. With the RFID tag coil 62 in a proximal location and substantially parallel to RFID reader coil 64, the electro-magnetic field 72 electro-magnetically couples the RFID tag coil 62 to the RFID reader coil 64. This is further illustrated in FIG. 5.

Figure 5:
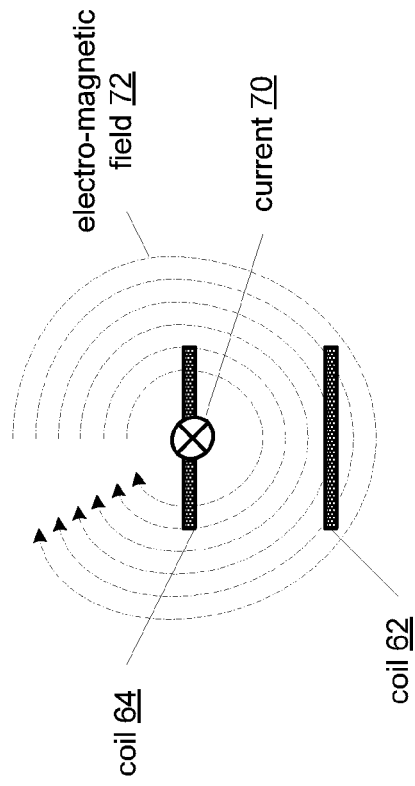
FIG. 5 is a diagram of electro-magnetic coupling between an RFID reader coil and an RFID tag coil in accordance with an embodiment of the present invention.
Figure 6:
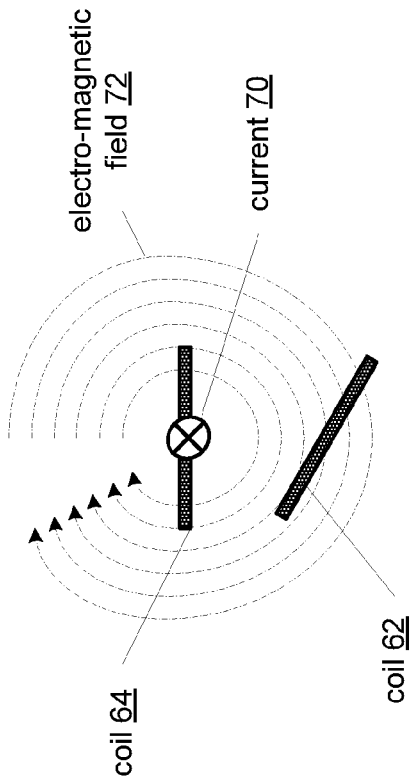
FIG. 6 is another diagram of electro-magnetic coupling between an RFID reader coil and an RFID tag coil in accordance with an embodiment of the present invention.

FIG. 5 is a diagram of electro-magnetic coupling 68 between the RFID reader coil 64 and the RFID tag coil 62. In this diagram, the coils 62 and 64 are parallel, thus the optimal level of electro-magnetic coupling is obtained. However, if the coils 62 and 64 are not parallel, as shown in FIG. 6, the electro-magnetic coupling is less than optimal. Thus, by having a plurality of coils in the RFID reader with different orientations, it is likely that one or more coils will provide a near optimal level of electro-magnetic coupling or, at a minimum, provide an acceptable level of electro-magnetic coupling.

Figure 7:
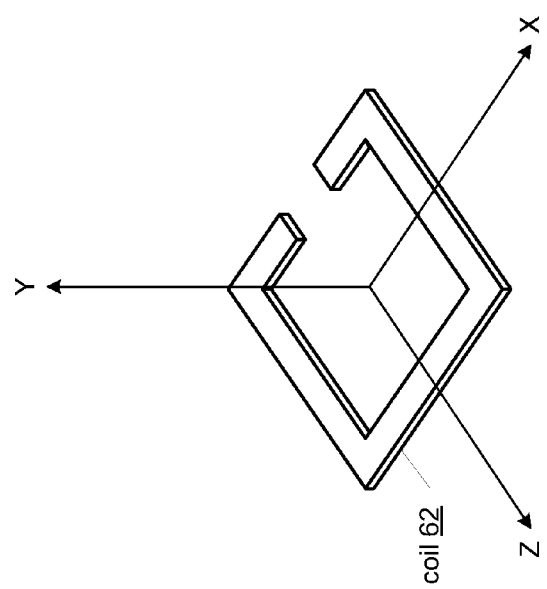
FIG. 7 is a diagram of an RFID tag coil with respect to a multi-dimensional axis system in accordance with an embodiment of the present invention.

FIG. 7 is a diagram of an RFID tag coil 62 with respect to a multi-dimensional axis system (e.g., X, Y, Z coordinate system). Note that in this example, the RFID tag coil 62 is shown as a single winding for ease of illustration but could include one or more windings on one or more surfaces of the supporting substrate (e.g., IC or PCB).

Figure 8:
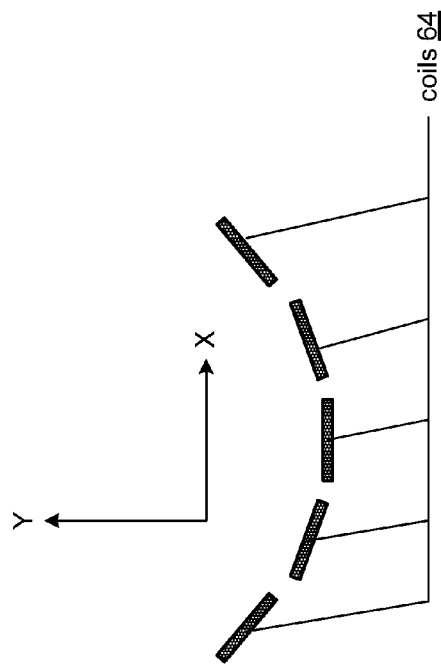
FIG. 8 is a diagram of a plurality of coils of an RFID reader in accordance with an embodiment of the present invention.

FIG. 8 is a diagram of a plurality of coils 64 of an RFID reader with respect to the multi-dimensional axis system of FIG. 7. In this illustration, each of the plurality of coils 64 has a different axial orientation with respect to the X-Y plane of the multi-dimensional axis system.

Figure 9:
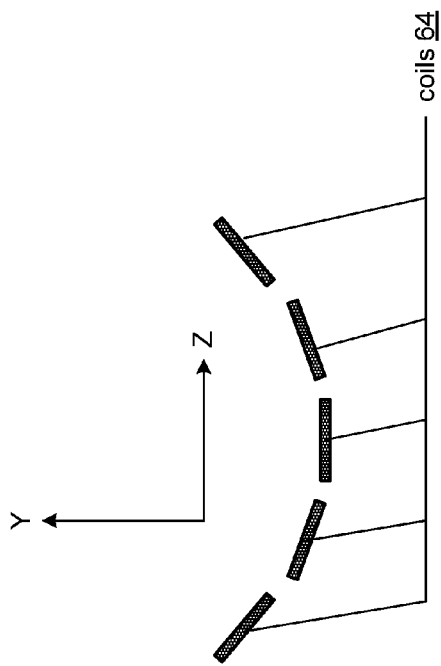
FIG. 9 is another diagram of a plurality of coils of an RFID reader in accordance with an embodiment of the present invention.

FIG. 9 is another diagram of a plurality of coils 64 of an RFID reader with respect to the multi-dimensional axis system of FIG. 7. In this illustration, each of the plurality of coils 64 has a different axial orientation with respect to the Y-Z plane of the multi-dimensional axis system. Note that the plurality of coils 64 may include more or less coils than shown in FIGS. 8 and 9 and may include both sets of coils of FIGS. 8 and 9. In this latter case, the RFID reader may be misaligned in two dimensions and still achieve a near optimal level of electro-magnetic coupling or, at a minimum, achieve an acceptable level of electro-magnetic coupling.

Figure 10:
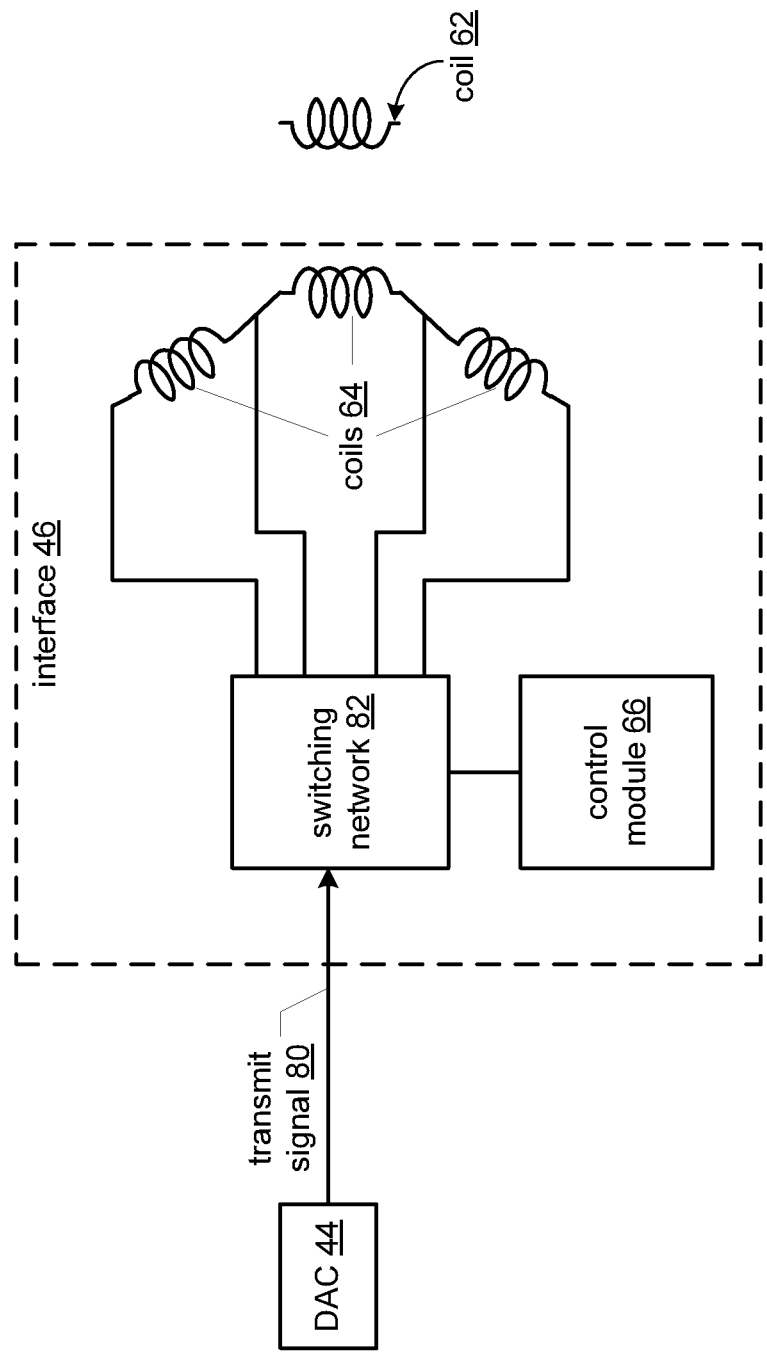
FIG. 10 is a schematic block diagram of an embodiment of a wireless power interface in accordance with an embodiment of the present invention.

FIG. 10 is a schematic block diagram of an embodiment of a interface 46 operable to derive power via the electro-magnetic coupling. The interface 46 includes the control module 66, the plurality of coils 64, and a switching network 82. In this embodiment, the switching network 82 receives a transmit signal 80 from the DAC 44. The control module 66 controls the switching network 82, which may be a plurality of switches, transistors, tri-state devices or a combination thereof, to provide the transmit signal 80 to one or more of the coils 64. In addition, when a response is received from coil 62 via the enabled one or more coils 64, the control module 66 receives the response from the switching network. The control module 66 may control the switching network 82 to provide the transmit signal 80 to the plurality of coils 64 as previously described with reference to FIG. 3.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A wireless power interface comprises:
a first coil of a first wireless power device;
a plurality of coils of a second wireless power device, wherein at least two of the plurality of coils having an orientation substantially aligned to at least two respective axes of a multi-dimensional axis system; and
a control module configured to enable at least one of the plurality of coils based on electro-magnetic coupling between the first coil of the first wireless power device and the at least one of the plurality of coils of the second wireless power device.

2. The wireless power interface of claim 1 comprises:
the first coil including at least one planer winding of a first geometry and of a first size; and
the at least one coil of the plurality coils including at least one planer winding of the first geometry and of a second size.

3. The wireless power interface of claim 1, wherein the control module is configured to enable the at least one of the plurality of coils based on the electro-magnetic coupling between the first coil and the at least one of the plurality of coils by:
providing a transmit signal to one of the plurality of coils;
measuring a response from the first coil via the at least one of the plurality of coils;
comparing the response with a response threshold;
when the response compares favorably with the response threshold, utilizing the at least one of the plurality of coils to derive power via the electro-magnetic coupling;
when the response compares unfavorably with the response threshold, determining whether each of the plurality of coils has been tested; and
when each of the plurality of coils has not been tested, repeating the providing, the measuring, and the comparing for another one of the plurality of coils.

4. The wireless power interface of claim 1, wherein the control module is configured to enable the at least one of the plurality of coils based on electro-magnetic coupling between the first coil and the at least one of the plurality of coils by:
providing a transmit signal to a first set of the plurality of coils, wherein an electro-magnetic field created by a coil of the first set of the plurality of coils has minimal interference with an electro-magnetic field created by another coil of the first set of the plurality of coils;
measuring a response from the first coil via the first set of the plurality of coils;
comparing the response with a response threshold;
when the response compares favorably with the response threshold, utilizing the first set of the plurality of coils to derive power via the electro-magnetic coupling; and
when the response compares unfavorably with the response threshold, repeating the providing, the measuring, and the comparing for a second set of the plurality of coils, wherein an electro-magnetic field created by a coil of the second set of the plurality of coils has minimal interference with an electro-magnetic field created by another coil of the second set of the plurality of coils.

5. The wireless power interface of claim 1, wherein the control module is configured to enable the at least one of the plurality of coils based on the electro-magnetic coupling between the first coil and the at least one of the plurality of coils by:
coupling the at least one of the plurality of coils as a winding of a transformer to a transmit circuit and a receive circuit.

6. The wireless power interface of claim 1, wherein the control module is configured to enable the at least one of the plurality of coils based on the electro-magnetic coupling between the first coil and the at least one of the plurality of coils by:
coupling the at least one of the plurality of coils as an antenna to a transmit circuit and a receive circuit.

7. A wireless power interface comprises:
a plurality of coils configured to derive wireless power, wherein at least two of the plurality of coils has an orientation substantially aligned with respect to at least two axes of a multidimensional axis system; and
a control module configured to enable at least one of the plurality of coils based on an acceptable level of electro-magnetic coupling by the at least one of the plurality of coils with a coil of a wireless power device.

8. The wireless power interface of claim 7, wherein each of the plurality coils comprises:

at least one planer winding of a first geometry and of a first size, wherein the at least one coil of the wireless power device includes at least one planer winding of the first geometry and of a second size.

9. The wireless power interface of claim 7, wherein the control module is configured to enable the at least one of the plurality of coils based on the electro-magnetic coupling between the at least one of the plurality of coils and the coil of the wireless power device by:
  providing a transmit signal to one of the plurality of coils;
  measuring a response from the coil of the wireless power device via the at least one of the plurality of coils;
  comparing the response with a response threshold;
  when the response compares favorably with the response threshold, utilizing the at least one of the plurality of coils to derive power via the electro-magnetic coupling;
  when the response compares unfavorably with the response threshold, determining whether each of the plurality of coils has been tested; and
  when each of the plurality of coils has not been tested, repeating the providing, the measuring, and the comparing for another one of the plurality of coils.

10. The wireless power interface of claim 7, wherein the control module is configured to enable the at least one of the plurality of coils based on electro-magnetic coupling between the at least one of the plurality of coils and the coil of the wireless power device by:
  providing a transmit signal to a first set of the plurality of coils, wherein an electro-magnetic field created by a coil of the first set of the plurality of coils has minimal interference with an electro-magnetic field created by another coil of the first set of the plurality of coils;
  measuring a response from the coil of the wireless power device via the first set of the plurality of coils;
  comparing the response with a response threshold;
  when the response compares favorably with the response threshold, utilizing the first set of the plurality of coils to derive power via the electro-magnetic coupling; and
  when the response compares unfavorably with the response threshold, repeating the providing, the measuring, and the comparing for a second set of the plurality of coils, wherein a magnetic field created by a coil of the second set of the plurality of coils has minimal interference with a magnetic field created by another coil of the second set of the plurality of coils.

11. The wireless power interface of claim 7, wherein the control module is configured to enable the at least one of the plurality of coils based on the electro-magnetic coupling between the at least one of the plurality of coils and the coil of the wireless power device by:
  coupling the at least one of the plurality of coils as a winding of a transformer to a transmit circuit and a receive circuit.

12. The wireless power interface of claim 7, wherein the control module is configured to enable the at least one of the plurality of coils based on the electro-magnetic coupling between the at least one of the plurality of coils and the coil of the wireless power device by:
  coupling the at least one of the plurality of coils as an antenna to a transmit circuit and a receive circuit.

13. A wireless power device comprises:
  a transmit section configured to convert outbound data into transmit near-field communications signals;
  a receive section configured to convert received near-field communications signals into inbound data; and
  a wireless power interface coupled to the transmit section and to the receive section, wherein the wireless power interface includes:
    a plurality of coils configured to derive wireless power, wherein at least two the plurality of coils has an orientation substantially aligned with at least two axes of a multi-dimensional axis system; and
    a control module configured to enable at least one of the plurality of coils based on an acceptable level of electro-magnetic coupling by the at least one of the plurality of coils with at least one coil of another wireless power device.

14. The wireless power device of claim 13, wherein each of the plurality coils comprises:
  at least one planer winding of a first geometry and of a first size, wherein the at least one coil of the another wireless power device includes at least one planer winding of the first geometry and of a second size.

15. The wireless power device of claim 13, wherein the control module is configured to enable the at least one of the plurality of coils based on the electro-magnetic coupling between the at least one of the plurality of coils and the at least one coil of the another wireless power device by:
  providing wireless power signals to one of the plurality of coils;
  measuring a response from the at least one coil of the another wireless power device via of the plurality of coils;
  comparing the response with a response threshold;
  when the response compares favorably with the response threshold, utilizing the at least one of the plurality of coils to derive power via the electro-magnetic coupling;
  when the response compares unfavorably with the response threshold, determining whether each of the plurality of coils has been tested; and
  when each of the plurality of coils has not been tested, repeating the providing, the measuring, and the comparing for another one of the plurality of coils.

16. The wireless power device of claim 13, wherein the control module is configured to enable the at least one of the plurality of coils based on electro-magnetic coupling between the at least one of the plurality of coils and the at least one coil of the another wireless power device by:
  providing the transmit near-field communications signals to a first set of the plurality of coils, wherein an electro-magnetic field created by a coil of the first set of the plurality of coils has minimal interference with an electro-magnetic field created by another coil of the first set of the plurality of coils;
  measuring a response from the at least one coil of the another wireless power device via the first set of the plurality of coils;
  comparing the response with a response threshold;
  when the response compares favorably with the response threshold, utilizing the first set of the plurality of coils to derive power via the electro-magnetic coupling; and
  when the response compares unfavorably with the response threshold, repeating the providing, the measuring, and the comparing for a second set of the plurality of coils, wherein an electro-magnetic field created by a coil of the second set of the plurality of coils has minimal interference with an electro-magnetic field created by another coil of the second set of the plurality of coils.

17. The wireless power device of claim 13, wherein the control module is configured to enable the at least one of the plurality of coils based on the electro-magnetic coupling between the at least one of the plurality of coils and the at least one coil of the another wireless power device by:

coupling the at least one of the plurality of coils as a winding of a transformer to the transmit section and the receive section.

18. The wireless power device of claim 13, wherein the control module is configured to enable the at least one of the plurality of coils based on electro-magnetic coupling between the at least one of the plurality of coils and the at least one coil of the another wireless power device by:

coupling the at least one of the plurality of coils as an antenna to the transmit section and the receive section.

19. The wireless power device of claim 18, wherein the antenna comprises a near-field antenna.

20. The wireless power device of claim 18, wherein the antenna comprises a radio frequency (RF) antenna.

* * * * *